Feb. 6, 1934.  L. R. BUCKENDALE  1,946,060

MOTOR VEHICLE

Filed Nov. 16, 1931  3 Sheets-Sheet 1

INVENTOR.
L. R. Buckendale
HIS ATTORNEYS

Feb. 6, 1934.  L. R. BUCKENDALE  1,946,060
MOTOR VEHICLE
Filed Nov. 16, 1931    3 Sheets-Sheet 2
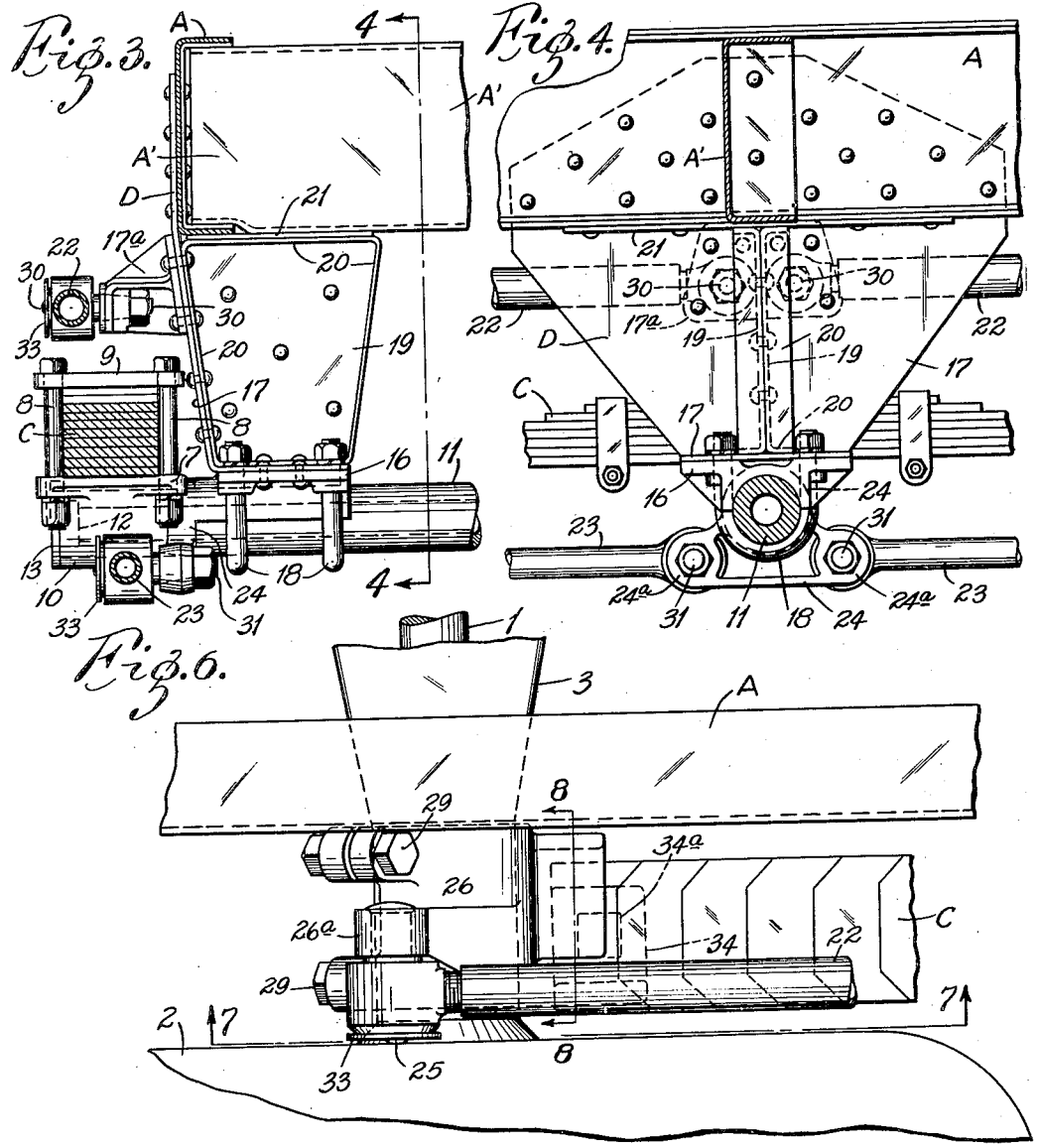
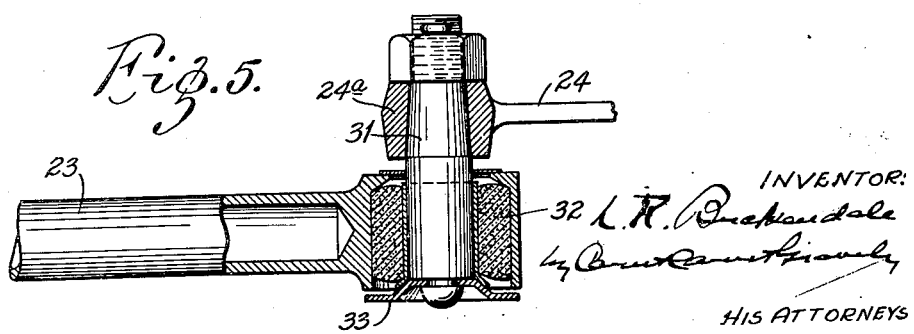

Feb. 6, 1934.  L. R. BUCKENDALE  1,946,060
MOTOR VEHICLE
Filed Nov. 16, 1931  3 Sheets-Sheet 3
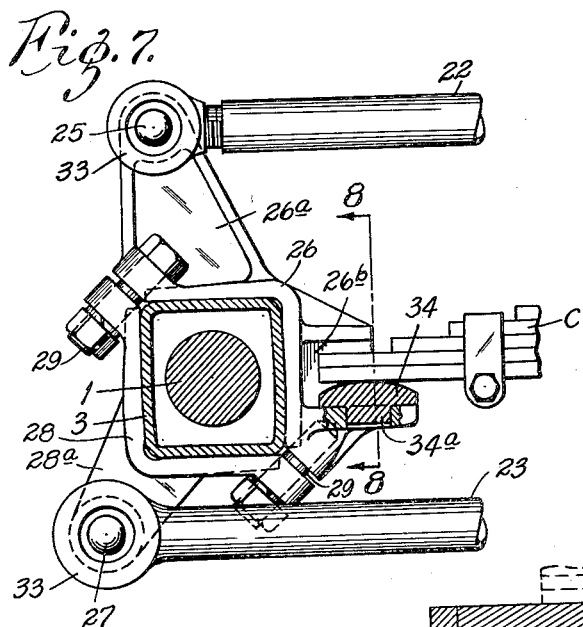
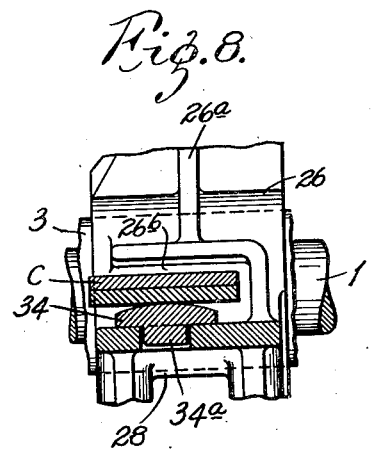
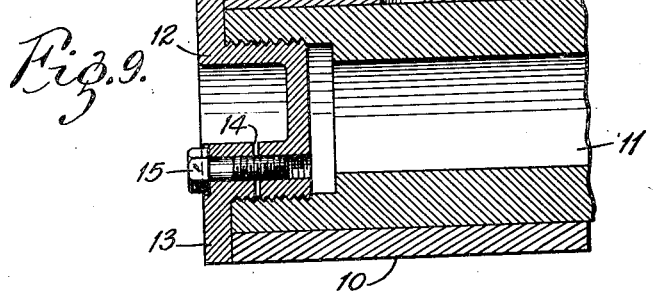
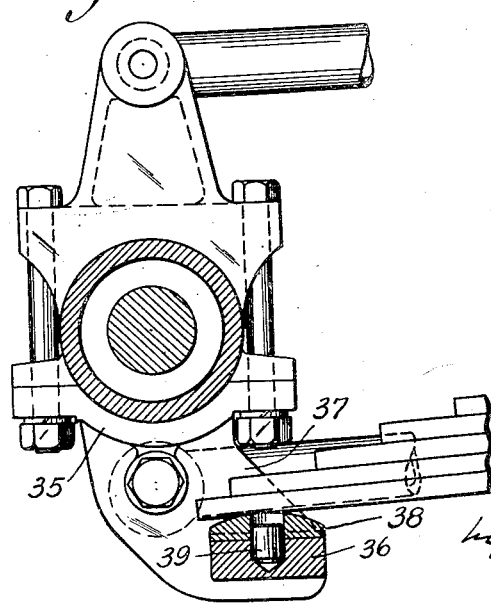
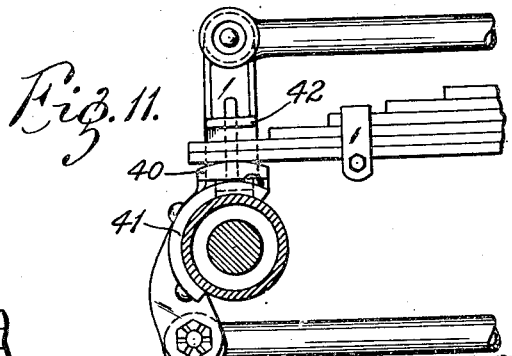
INVENTOR:
Laurence R Buckendale
by [signature]
HIS ATTORNEYS.

Patented Feb. 6, 1934

1,946,060

UNITED STATES PATENT OFFICE 1,946,060

MOTOR VEHICLE

Laurence R. Buckendale, Detroit, Mich., assignor to The Timken-Detroit Axle Company, Detroit, Mich., a corporation of Ohio Application November 16, 1931
Serial No. 575,191

15 Claims. (Cl. 280—124)

This invention relates to motor vehicles of the kind wherein two load supporting axle housings are connected together to form a truck provided with body supporting springs that extend from axle housing to axle housing and serve to distribute the load therebetween. The principal objects of the present invention are to permit deflection of said body supporting springs without affecting the parallelism and spacing of said axle housings, to permit independent endwise movement of the two axle housings laterally of the vehicle, and thus facilitate steering and minimize distortion upon the tires by permitting the wheels to track when rounding a curve, to provide means for resisting the driving and braking torque exerted on said axle housings and for maintaining them parallel and in proper spaced relation, to permit relative vertical movement of the axle housings without tilting thereof, and to provide for simplicity, cheapness of construction, and compactness and lightness of design. The invention consists in the construction, combinations and arrangements of parts hereinafter described and claimed.

In the accompanying drawings, which form part of this specification, and wherein like symbols refer to like parts wherever they occur, Fig. 1 is a plan view of a portion of the chassis of a motor vehicle provided with a dual driving axle unit embodying my invention, Fig. 2 is a vertical longitudinal section on the line 2—2 in Fig. 1, Fig. 3 is a vertical section on the line 3—3 in Fig. 2, Fig. 4 is a vertical section on the line 4—4 in Fig. 3, Fig. 5 is a horizontal longitudinal section through one end of one of the torque rods, showing the manner of connecting said end to the anchor stud therefor, Fig. 6 is a fragmentary plan view of one of the axles in the region of one of the spring ends, Fig. 7 is a vertical section on the line 7—7 in Fig. 6, Fig. 8 is a vertical section on the line 8—8 in Fig. 6 or Fig. 7;

Fig. 9 is a detail section of the spring supporting tube end; and

Figs. 10 and 11 are views similar to Fig. 7, showing modified forms of fittings for supporting the spring ends.

Figure 1:
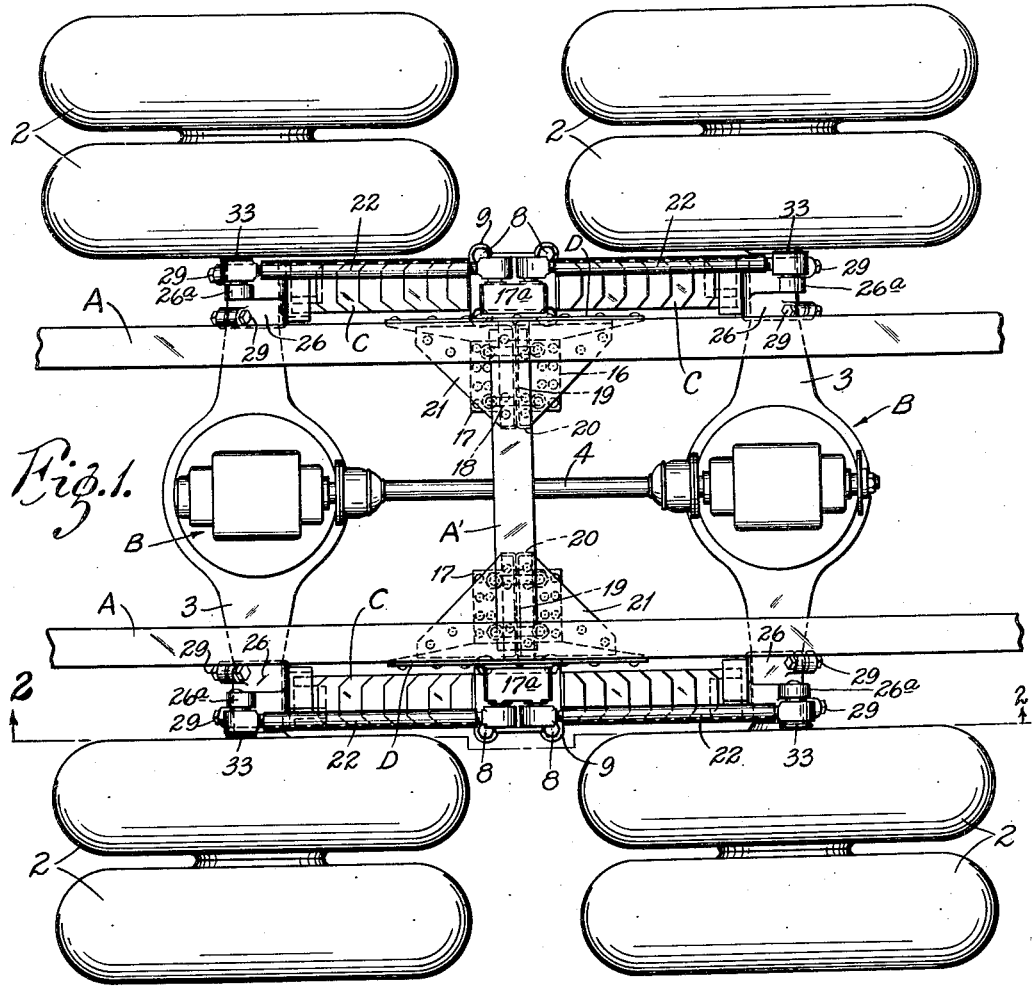
Figure 2:
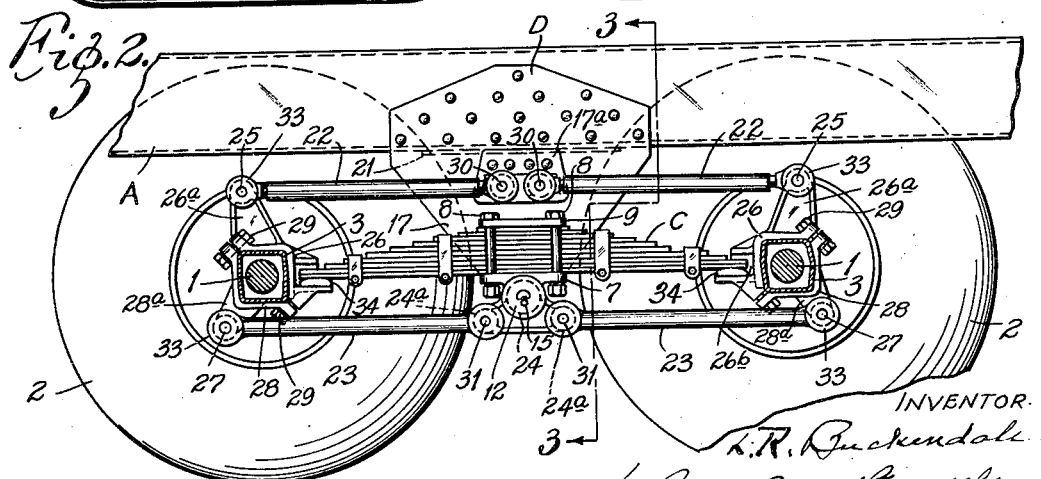

The accompanying drawings illustrate portions of the longitudinal side frame members A of a motor vehicle, and two spaced parallel axle constructions B that are connected together to form a truck provided with body supporting leaf springs C adapted to distribute the body load equally between said axle constructions. The two axle constructions B of the truck are preferably driving axle constructions of standard design. Each of said axle constructions comprises axially alined axle shaft sections 1 carrying road wheels 2 at their ends adapted to receive motion from the usual differential mechanism (not shown). The axle shaft sections 1 and differential mechanism of each driving axle construction B are encased within a load supporting axle housing 3, and the two driving axle constructions are coupled together to receive motion from the propeller shaft of the engine (not shown) by means of suitable driving connections 4 extending between the two axle housings. This construction of dual driving axle unit or truck thus far described is well known and it is considered unnecessary to illustrate it in detail.

The body supporting leaf springs C are preferably located between the wheels 2 and the side members A of the vehicle frame and extend between corresponding ends of the axle housings 3 with their ends resting thereon. A plate 7 is secured to the underside of each leaf spring C midway of the ends thereof by means of bolts 8 that extend through registering holes provided therefor in said plate and in a clamping plate 9 that rests on the top of said spring. The bottom plate 7 of each spring is provided on its underside with a boss 10, which is provided with a cylindrical bore that extends transversely of said spring and is adapted to rotatably engage and support one end of a cross-member in the form of a cylindrical tube 11 that extends from spring to spring between the two axle constructions B. The ends of the tubular cross-member 11 are threaded interiorly to receive threaded plugs 12 that are provided with flanges or head portions 13, which bear against the outer ends of the bosses 10 on the underside of the plate 7 on the undersides of the springs and thus prevent axial movement of said cross-member in the bores in said lugs. The threaded plug 12 in each end of the cross-tube 11 is provided with a slot 14 that is disposed at an oblique angle to the axis of said plug; and a cap screw 15 extends through said plug parallel to the axis thereof with its inner end threaded into the portion of the plug located inwardly of said slot, whereby the operation of tightening the cap screw causes the threads of the plug to bind on the threads in the cross-tube and thus firmly lock the plug in place.

The side members A of the vehicle frame are preferably made of channels that are disposed with their webs vertical and with their flanges facing inwardly. The two channel-shaped side rails A are connected together by a cross-channel A' located directly above the cross-tube 11. The vehicle frame is provided at each side with a depending bracket D that rests upon a saddle member 16, which straddles the cross-tube 11. Each of said brackets D comprises an angle-shaped member 17 with one flange disposed vertically and riveted to the outer face of the adjacent channel-shaped side frame member A and with the other flange extending inwardly and resting upon the top of the saddle member 16 and rigidly secured thereto by means of U-bolts 18, which also rigidly secure said saddle member to the cross-tube. The angle member 17 is reinforced and strengthened by means of two vertically disposed plates 19 that are riveted together flatwise between the inwardly extending bottom flange of said angle member and the cross-channel A' of the vehicle frame. The plates 19 are provided with marginal flanges 20 that are riveted to the flanges in the angle member 17; and a gusset plate 21 is interposed between the tops of the flanged plates 19 and the undersides of the side rails A and cross-member A' and is riveted or otherwise rigidly secured to the flanges of said plates, said cross-member and said side rail.

Located above each of the side springs C and extending longitudinally thereof are two torque rods 22; and located below said spring and extending longitudinally thereof are two torque rods 23. Each of the upper torque rods 22 is connected at one end with an axle housing and at the other end to a bracket 17a that is riveted to the outside face of the bracket D that depends from the adjacent side frame member A' of the vehicle. Each of the lower torque rods 23 is connected at one end to an axle housing and at the other end to an annular member 24 sleeved on the cross-tube 11 between the frame supporting saddle 16 and the spring supported member 7. The remote ends of the two upper torque rods 22 are supported on studs 25 that project from upstanding lugs 26a on angle-shaped brackets 26 that fit the inner upper corners of the respective axle housings. The remote ends of the lower torque rods 23 are similarly supported on studs 27 fixed to lugs 28a that depend from angle-shaped brackets 28 that fit the lower outer corners of the respective axle housings. The brackets 26 and 28 are clamped together about the axle housing by means of bolts 29 that pass through lugs in the adjacent ends of said brackets. The adjacent ends of the upper torque rods 22 are supported on studs 30 that project horizontally from the bracket 17a; and the adjacent ends of the lower torque rods 23 are similarly supported on studs 31 fixed to lugs 24a that project from opposite sides of the annular member 24 that is sleeved on the cross-tube 11. Each end of each torque rod is provided with an opening adapted to receive the supporting stud therefor; and an annular member 32 of rubber or other nonmetallic material is interposed between said stud and the opening therefor and is held in said opening by means of a circular plate 33 that is riveted to the end of said stud.

Each side spring is located between the axle housings with each end extending into a recess 26b provided therefore in the depending inner flanges of the angle brackets 26 that support remote ends of the upper torque rods 22. Resting on the bottom of the recess 26b for each end of the spring is a pad 34 that has a square lug 34a depending therefrom, adapted to fit a similarly shaped opening in the bottom wall of said recess to prevent lateral and rotary movement of said pad. As shown in the drawings, the spring supporting surface of the pad 34 is spherically curved so as to permit the end of the spring to rock thereon when the spring is deflected. The recess, while loosely confining the spring end therein, permits relative movement of the spring and the axle housing in all directions.

In the modified construction shown in Fig. 10 the spring extends beneath the axle housing, and the brackets 35 for supporting the remote ends of the lower torque rods are provided with depending lugs 36 having pockets or recesses 37 therein adapted to loosely receive the ends of the spring. The ends of the springs are supported in the bottoms of the recesses 37 in the brackets 35 by means of pads 38 that are held in place by means of dowel pins 39. The spring supporting surfaces of the pads 38 are spherically curved similar to the spherically curved surfaces of the pads 34.

In the modification shown in Fig. 11, the springs are located above the axles with their ends overlapping the axles and resting upon the spherically curved upper surfaces of pads 40 that are seated upon the upper end of a bracket 41 that is riveted to the axle housing. The bracket 41 is provided adjacent to the inner side of the spring with an upstanding lug 42 having a horizontally extending flange that overhangs the spring end and serves to loosely hold the spring end in position on the pad.

By the arrangement described, the torque rods serve to maintain the two axles parallel and in proper spaced relation and, at the same time, serve to resist the tendency of the axle housings to turn or rotate on their axes by transmitting the torque stresses from the axle housings to parts that are rigid with the vehicle frame. The torque rods also permit independent vertical movement of the axle housings due to the topography of the road; and the spring is free to oscillate about the axis of the cross-tube to allow the springs to accommodate themselves to such movement. The torque rods also tend to resist tilting of the axle during such movement. The cushioned connections at the ends of the torque rods serve to deaden noise and vibration, and permit limited relative movement of the torque rods and the parts cooperating therewith; and they also tend to return the parts to normal position. The loose connections between the ends of the springs and the axle housings permit the ends of the springs to slide and rock on the axle housings in response to spring deflection without affecting the axle spacing; and said connections also facilitate the operation of steering and minimizing distortion of the tires by permitting the axles to shift laterally of the vehicle independently of each other so that the wheels are permitted to track when rounding a curve.

Obviously, the hereinbefore described arrangement admits of considerable modification without departing from the invention. Therefore, I do not wish to be limited to the precise construction and arrangements of parts shown and described.

What I claim is:

1. In a motor vehicle, a truck comprising two axles, means for maintaining said axles in proper spaced relation, each of said axles having a recess therein opening toward the other axle, a spring extending from axle to axle with each end resting in a recess for distributing the load of the vehicle between said axles, and means permitting independent endwise movement of said axles relative to said spring and longitudinal movement of said spring independently of said axles, said recess also opening at one side.

2. In a motor vehicle, a truck comprising two axles, means for maintaining said axles in proper spaced relation, each of said axles having a recess therein opening toward the other axle, and a member extending from axle to axle with its ends slidably supported in the recesses therein for distributing the load of the vehicle between said axles, thereby permitting independent endwise movement of said axles relative to said member and longitudinal movement of said member relative to said axles, said recesses also opening toward the outer ends of the axles, thereby permitting insertion and removal of said member from the outside.

3. In a motor vehicle, a truck comprising two axles, means for maintaining said axles in proper spaced relation, each of said axles having a recess therein opening toward the other axle, and a member extending from axle to axle with its ends slidably supported in the recesses therein for distributing the load of the vehicle between said axles, thereby permitting independent endwise movement of said axles relative to said member and longitudinal movement of said member relative to said axles, said recesses opening toward the ends of the axle, thereby permitting insertion and removal of said member from the outside, the supporting surfaces of said recesses being convexly spherical.

4. An automotive truck comprising two axle constructions including load supporting housings, means for maintaining said axle housings in proper spaced relation, recesses in said housings, and a leaf spring extending from housing to housing with its ends movably supported in the recesses thereof said recesses opening toward the outer ends of the axles, thereby permitting insertion and removal of said spring from the outside.

5. In a motor vehicle, a truck comprising two driving axles, load supporting housings therefor, brackets removably secured to said housings and provided with recesses, and a leaf spring extending from housing to housing with its ends extending into the recesses in said brackets and removable spring supporting pads mounted in said recesses.

6. In a motor vehicle, a truck comprising two driving axles, load supporting housings therefor, brackets secured to said housings, a leaf spring extending from housing to housing with its ends slidably supported on said brackets, means on said brackets for limiting the relative movement of said spring and said housings, said brackets being open on the sides nearest the outer ends of the axles, thereby permitting insertion and removal of said leaf spring without disturbing the brackets.

7. In a motor vehicle, a truck comprising two driving axles, load supporting housings therefor, means for maintaining said axles in proper spaced relation and for resisting the torque reactions of said housings, brackets rigidly secured to said housings and provided with recesses, a leaf spring extending from housing to housing with its ends loosely confined in the recesses in the brackets on said housings, said brackets being open on the sides nearest the outer ends of the axles, thereby permitting insertion and removal of said leaf spring without disturbing the brackets.

8. In a motor vehicle, a truck comprising two driving axles, load supporting housings therefor, means for maintaining said axles in proper spaced relation and for resisting the torque reactions of said housings, brackets rigidly secured to said housings and provided with recesses, and a leaf spring extending from housing to housing with its ends loosely confined in the recesses in the brackets on said housings, and spring supporting pads removably mounted in said recesses and provided with convex spherical spring supporting surfaces.

9. In a motor vehicle, a truck comprising two axles, housings therefor, torque rods for maintaining said axles in proper spaced relation, a leaf spring extending from axle to axle for distributing the load of the vehicle between the housings therefor, brackets fixed to said housings for slidably supporting the ends of said springs thereon, a member secured to said spring intermediate the ends thereof, said springs and said brackets being removable from the vehicle independently of each other, and a torque rod extending from the spring supporting bracket on each axle housing to the member secured to said spring.

10. In a motor vehicle, a truck comprising two axles, housings therefor, torque rods for maintaining said axles in proper spaced relation, a leaf spring extending from axle to axle for distributing the load of the vehicle between the housings therefor, brackets fixed to said housing for slidably supporting the ends of said springs thereon, said springs being removable from said vehicle without disturbing said brackets, a member secured to said spring intermediate the ends thereof, a torque rod extending from the spring supporting bracket on each axle housing to the member secured to said spring, and nonmetallic cushioning connections between said torque rods and said spring supporting brackets and said spring supported member.

11. In a motor vehicle, a body supporting frame, a truck comprising two axles, leaf springs extending from axle to axle, members supporting by said springs intermediate the ends thereof, a cross-member extending from spring to spring with its ends supported in the members supported thereon, and means for supporting said frame on said cross-member, said means comprising a saddle member mounted on said cross-member and a bracket depending from said frame and resting on said saddle, said bracket comprising an angle-shaped plate having one flange resting on said saddle member and the other flange secured to said frame, a plate secured to the flange of said angle-shaped plate, and a gusset plate interposed between and secured to said frame and said plate.

12. In a motor vehicle, a body supporting frame, a truck comprising two axles, housings therefor, leaf springs extending from housing to housing with their ends supported thereon, spring seats fixed to said springs intermediate the ends thereof, a cross-member extending from spring to spring with its ends mounted in said spring seats, brackets fixed to said frame and supported on said cross-member, members sleeved on said cross-member between said spring seats and said brackets, and torque rods located above and below said springs and connecting each housing to said brackets and to the members sleeved on said cross-member.

13. In a motor vehicle, a body supporting frame, a truck comprising two axles, housings therefor, leaf springs extending from housing to housing with their ends supported thereon, members fixed to said springs intermediate the ends thereof, a cross-member extending from spring to spring with its ends mounted therein, brackets fixed to said frame and supported on said cross-member, members sleeved on said cross-member adjacent to said springs, torque rods located above and below said springs and connecting each housing to said brackets and to the members sleeved on said cross-member, and cushioning connections between said torque rods and said housings and said bracket, and means whereby said springs are adapted to be mounted on and dismounted from said vehicle without disturbing said torque rods or said brackets.

14. In a motor vehicle, a body frame, a truck comprising two axle constructions, load supporting housings therefor, springs extending from housing to housing adjacent to the corresponding ends thereof with their ends overlapping said housings, and brackets secured to said housings and having portions resting on the tops thereof for slidably supporting the overhanging ends of said springs and portions for limiting relative movement of said springs and said housings laterally of said vehicle, said brackets being open on the sides facing the outer ends of the axles, thereby permitting insertion and removal of said springs from the outside without disturbing said brackets.

15. In a motor vehicle, a body frame, a truck comprising two axle constructions, load supporting housings therefor, springs extending between said housings at the corresponding ends thereof with their ends extending beneath said housings, and brackets secured to said housings for slidably supporting and loosely confining the underlying ends of said springs, said brackets being open on the sides facing the outer ends of the axles, thereby permitting insertion and removal of said springs from the outside without disturbing said brackets.

LAURENCE R. BUCKENDALE.